M. C. WHITE.
STRAINER.
APPLICATION FILED AUG. 15, 1908.
942,121.
Patented Dec. 7, 1909.
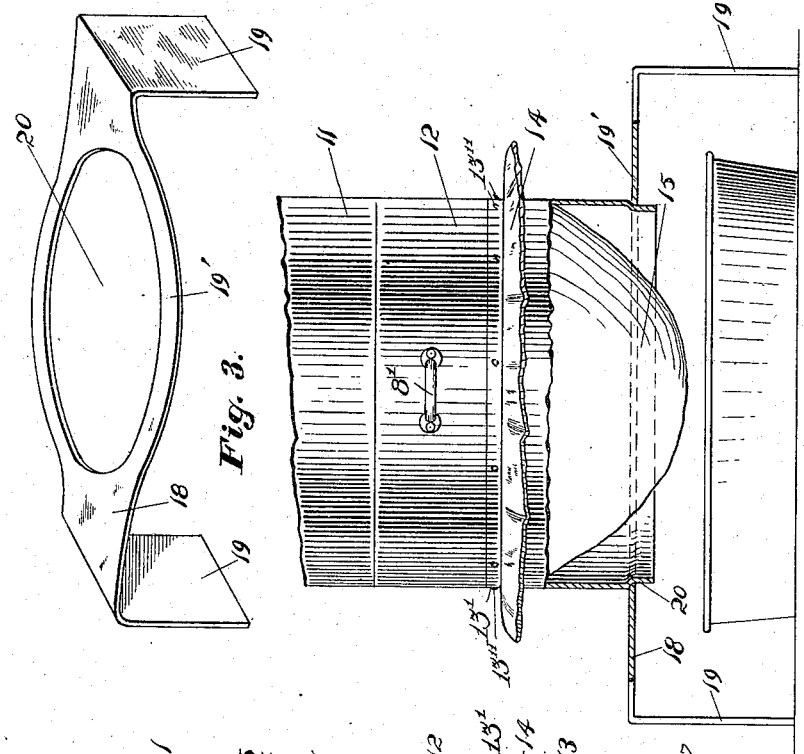
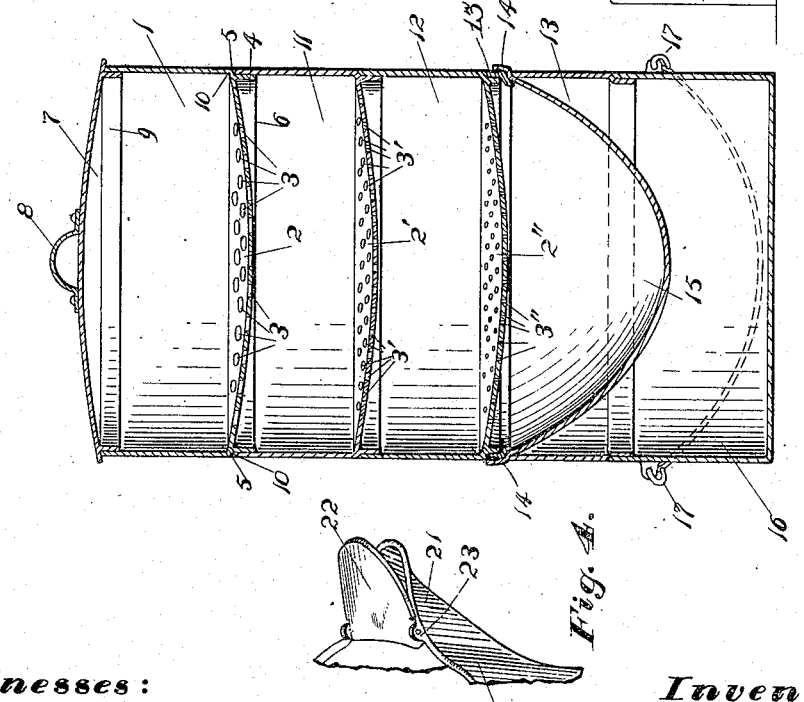
Witnesses:
E. Kernwein
Milton Lenoir
Inventor:
May C. White.
By Heidman & Strut
Attys.

UNITED STATES PATENT OFFICE.

MAY C. WHITE, OF KENILWORTH, ILLINOIS.

STRAINER.

942,121. Specification of Letters Patent. Patented Dec. 7, 1909.

Application filed August 15, 1908. Serial No. 448,688.

*To all whom it may concern:*

Be it known that I, MAY C. WHITE, a citizen of the United States, and resident of Kenilworth, in the county of Cook and State of Illinois, have invented certain new and useful Improvements in Strainers, of which the following is a specification, reference being had to the accompanying drawing, which forms a part of my specification.

My invention relates to strainers, and more particularly to that class of the same which is particularly adapted to be used when obtaining fruit juices, in making jellies, fruit syrup, soups, gravies, and the like.

The object of my invention is to provide a strainer of the character mentioned, which will be adapted to effectually and thoroughly strain a liquid, that is remove from the same any solid matter contained therein; and the invention consists in providing a device which is composed of a series of members or receptacles, all of uniform dimensions, some of which are provided with perforated bottoms or wire-gauze, the perforations in the different receptacles or members being of gradually increasing fineness; said receptacles being adapted to be removably supported upon and above one another to permit of ready access being had to the interior of the various members.

My invention further consists in a supporting member, having a centrally positioned perforation or opening over which the strainer or any of its members is adapted to take; said supporting member being preferably made to straddle a pan or kettle of a diameter within ordinary range, thus facilitating readily depositing the strained liquid into any ordinary sized vessel. My improved strainer is so constructed as to facilitate the depositing of the strained liquid into any ordinary sized pan or kettle.

A further object of my invention is to provide a strainer of the character mentioned which will be strong, durable and simple of construction, as will appear from the following description.

My invention will be more readily understood by reference to the accompanying drawing, in which:—

Figure 1 is a central vertical section through the preferred form of my device. Fig. 2 is a side elevation of a portion of my strainer, with a part shown in section, showing the same supported upon the supporting-member or rack. Fig. 3, is a detail perspective of the supporting member or rack shown in Fig. 2. Fig. 4, is a detail of the lidded lip or spout of the receiving-receptacle.

Referring to the drawing, 1 indicates one of the strainer-members or receptacles, which may be of any ordinary or preferred form, but preferably cylindrical, as I have shown in the drawings. The bottom 2 of said receptacle, which is preferably concave as shown, is provided with a number of preferably circular perforations 3. The lower portion 4 of said receptacle 1 is preferably made as shown, of a smaller diameter than the body portion of said receptacle, to form the annularly extending shoulder 5. Bottom 2 may either be held in place by the shoulder 5, or it may be secured to the side walls of receptacle or member 1, in any well-known manner. The lower edge 6 of portion 4 of the side walls of member 1, is made preferably to extend beyond the horizontal plane in which the lowest point of the concaved bottom 2 lies, thus providing protection for said concave portion when it is exposed, preventing its being damaged when member or receptacle 1 is removed from the other members. This protection is especially necessary when the bottom is made of thin material or wire-gauze, in which case it is more likely to become damaged and dented when the receptacle is removed from the other strainer-receptacles or members and placed upon a table-top or the like. The receptacle or member 1 is also provided with a suitable lid 7 to which is suitably secured a handle 8; said lid being preferably provided with a depending flange 9 which is adapted to rest against the inner surface of the receptacle 1, thereby effecting a snug and tight connection. Supporting said receptacle or member 1 and having its upper edge 10 resting against the underface of the shoulder 5, and adapted to snugly receive the portion 4 of member 1, as clearly shown in Fig. 1, is a strainer receptacle or member 11, said receptacle or member being identical in construction with the member 1, except that the perforations 3′ of its concave bottom 2′ are slightly smaller than the perforations 3 in the bottom 2 of the member 1. Supporting said member 11 in the same manner as the receptacle or member 1 is supported upon receptacle or member 11, is a strainer-receptacle or member 12, the same being identical in construction with the strainer-members 1 and 11 just described, except that the perforations 3'' in the bottom 2'' of the same are for obvious reasons, made slightly smaller than those in the bottom 2' of the receptacle 11.

Supporting the receptacle 12 in the same manner as the receptacles or members 1 and 11 are supported upon members 11 and 12, respectively, is a narrow or shallow bottomless member 13'. This member 13' is supported on a second bottomless-member 13 which is identical in construction with members 1, 11 and 12, except of course, that it is not provided with a bottom. Suspended by having its edges 14 resting or supported between the members 13' and 13 as clearly shown in Figs. 1 and 2, is a cloth 15, which may be in the nature of a bag; this is provided so as to facilitate thorough and effectual straining of liquid that has passed through the different members. The narrow or shallow member 13' may be provided on its outer face with small upwardly extending burs, as shown at 13'' over which the outer edge of the cloth-bag 15 may be pressed, thereby securely holding the bag 15 suspended within member 13' after said member has been taken from the lower member. This will greatly facilitate the handling of the cloth-bag with its contents, when it is desired to dismantle the strainer.

Supporting the member 13 in a manner identical with the manner of supporting the receptacles 1, 11 and 12, is a receiving kettle or receptacle 16, said kettle being provided with a suitable handle 17, and a lidded lip or spout 21; 22 indicating the lid of said lip which is adapted to be held in open or closed position by frictional contact with the ears 23 on the spout or lip 21.

In order that my strainer may be readily used with any sized pan or vessel, that is, so as to facilitate readily depositing the liquid passed through the strainer into said pan or vessel, I provide a support or straddle-rack 18. Said rack is provided with the legs 19, the horizontally disposed portion 19' of said rack being provided with a centrally positioned circular perforation or opening 20. This perforation or opening 20 is made of such a diameter as to snugly receive that contracted portion or wall of the member 13, or any of the members, corresponding to the portion 4 of the receptacle or member 1; the shoulder of said member corresponding as shown, to the shoulder 5 of the receptacle 1, and being adapted to rest upon the upper surface of said straddle-rack or support 18, as clearly shown in Fig. 2 of the accompanying drawings.

In Fig. 2 of the drawing, I have shown the receptacle into which the strained liquid is deposited, as being of a height less than that of the legs 19 of the straddle-rack, in which case, the straddle-rack rests upon its legs as shown; however, if the receiving pan or vessel is higher than the straddle-rack, said rack member may rest upon the upper edge of the pan or vessel; thus the height or diameter of the receiving pan does not make any material difference, the strained liquid being deposited just as readily into any sized receptacle as into the receiving kettle 16 as shown in Fig. 1, the latter being especially designed for that purpose. Either the lower strainer-member 12 or all of the members may be provided with suitable handles or grasps, as indicated at 8' in Fig. 2. With this arrangement, it is obvious that a thorough cleansing of the liquid passed through the strainer is effected, and at the same time the straining almost instantly performed. The perforations being largest in the top or first strainer-member, the largest solid particles only, contained within the liquid to be strained, are retained in this member, but by having a plurality of such receptacles provided with perforations of gradually increasing fineness, and finally a cloth-bag through which the liquid is passed, the finer solids are gradually removed, and it is obvious that a thorough cleansing of the liquid as stated, is thus effected.

I have shown my improved device or strainer as provided with three strainer-members, two bottomless members and a receiving kettle, but it is apparent however, that any number of such strainer-members or receptacles may be arranged as shown and described, to effect a still more thorough cleansing without departing from the spirit of my invention, and I do not wish to be understood as limiting myself to the exact construction shown and described, but

What I claim as my invention and wish to secure by Letters Patent, is:—

A strainer comprising a series of strainer-members provided with bottoms having perforations of increasing fineness, the side walls extending below the horizontal plane of the bottoms, bottomless-member provided with means on the outer surface adapted to secure the edges of a cloth to be arranged in the member below the lower strainer-member, the lower edges of the members being contracted to form annular shoulders, said contracted portion taking within the upper wall of the succeeding member, in combination with a member adapted to receive the contracted wall of the lower member and support the assembled members to permit of proper straining operation.

MAY C. WHITE.

Witnesses:
F. A. LESTER,
ANNA CARLSON.